United States Patent [19]
Van Tine

[11] 3,785,073
[45] Jan. 15, 1974

[54] NEGATIVE PROOF VIEWER
[76] Inventor: George K. Van Tine, 905 Harvey Rd., Claymont, Del. 19703
[22] Filed: Dec. 27, 1971
[21] Appl. No.: 212,608

[52] U.S. Cl.............. 40/63 A, 40/64 A, 40/106.1, 350/238
[51] Int. Cl............................................ G09f 13/10
[58] Field of Search............ 40/63 A, 64 A, 106.1, 40/130 B, 152.2; 350/235, 236, 237, 238, 239

[56] References Cited
UNITED STATES PATENTS

| | | | |
|---|---|---|---|
| 2,501,446 | 3/1950 | Justice | 350/238 X |
| 1,640,230 | 8/1927 | Blau | 350/231 X |
| 2,345,416 | 3/1944 | Naramore | 40/63 A |
| 2,876,674 | 3/1959 | Ohlhaver | 40/64 A X |
| 3,226,866 | 1/1966 | De Poray | 40/152.2 |

FOREIGN PATENTS OR APPLICATIONS
495,984   11/1938   Great Britain................... 40/106.1

Primary Examiner—Robert W. Michell
Assistant Examiner—John F. Pitrelli
Attorney—Connolly & Hurtz

[57] ABSTRACT

Negative proof viewer for viewing negatives and seeing them as positive pictures comprises a casing with support structure inside said casing for holding photographic negatives. A light source inside said casing is spaced from said support structure and said source is constructed and arranged to direct a beam of light onto a photographic negative on said support structure. A lens associated with said casing is located in the path of light reflected from said photographic negative on said support structure.

2 Claims, 2 Drawing Figures

PATENTED JAN 15 1974

3,785,073

NEGATIVE PROOF VIEWER

BACKGROUND OF THE INVENTION

The present invention relates to a negative proof viewer, and more particularly to a simple device for viewing negatives and seeing them as positive pictures.

Prior to the present invention numerous devices and schemes have been proposed for viewing photographic negatives before making positive prints from the negatives. For the most part, the heretofore proposed devices and schemes are characterized by their overall complexity with regard to manufacturing and operating techniques. Moreover, from an economic standpoint, the proposed prior art devices would be quite expensive to produce and therefore place them well beyond the financial reach of most amateur photographers. Accordingly, the photographic industry has long sought a simple and inexpensive device which is capable of making a photographic negative appear as a positive prior to printing. Obviously, by using such a device the photographer can easily determine how particular negatives will appear as positive prints prior to actually making the positives.

Examples of the prior art are found in U. S. Pat. No. 3,498,705, granted Mar. 3, 1970; U. S. Pat. No. 3,131,303, granted Apr. 28, 1964; and U. S. Pat. No. 2,969,709, granted Jan. 31, 1961.

SUMMARY OF THE INVENTION

Hence, the primary object of the present invention is to provide a negative proof viewer which is simple and inexpensive to manufacture and which can be operated in a simple and beneficial manner to achieve the result of viewing negatives and seeing them as positive pictures.

In accordance with the present invention a negative proof viewer for viewing negatives and seeing them as positive pictures comprises a casing with support structure inside the casing for holding a photographic negative. A light source inside the casing spaced from the support structure is constructed and arranged to direct a beam of light onto a photographic negative on the support structure. A lens associated with the casing is located in the path of reflected light from a photographic negative on the support structure.

Moreover, in accordance with the present invention, the support structure of the viewer may include a dark background at its supporting surface. Also, slotted openings may be provided directly adjacent the supporting surface of the support structure on opposite sides thereof for guiding photographic negatives onto the support structure and through the casing. A surrounding sheath may be associated with the light source for directing the beam of light onto the supporting surface of the support structure.

Additionally, the light source may be particularly constructed and arranged inside the casing to direct the light beam onto the photographic negative on the support structure at an angle of approximately 45°. The path of reflected light from the photographic negative will also be approximately 45° and the lens is located in that path for viewing the negative.

BRIEF DESCRIPTION OF THE DRAWING

Novel features and advantages of the present invention in addition to those mentioned above will become apparent to those skilled in the art from a reading of the following detailed description in conjunction with the accompanying drawing wherein.

DETAILED DESCRIPTION OF THE INVENTION

Figure 1:
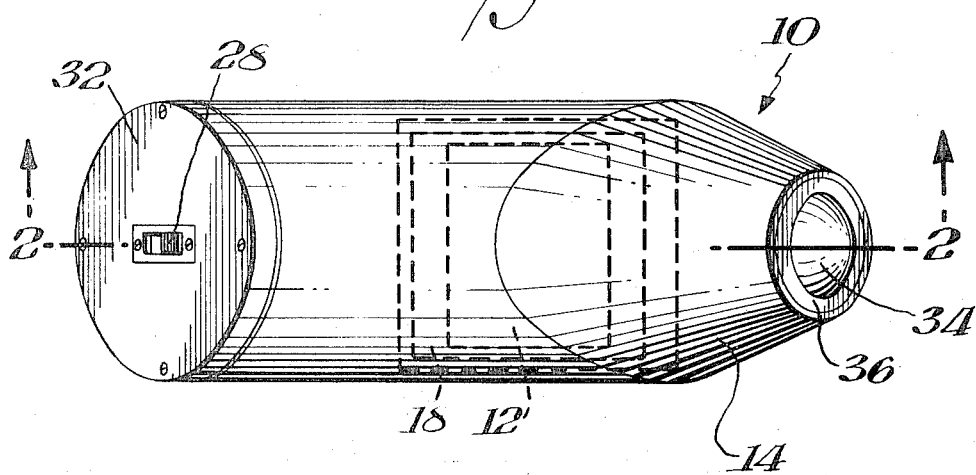
FIG. 1 is a top plan view of a negative proof viewer according to the present invention.

Referring in more particularity to the drawing, the several Figures illustrate a negative proof viewer 10 for viewing a photographic negative 12 and seeing it as a positive picture. The viewer 10 can be used to view black and white negatives, color negatives, and still and movie film. The operation of the viewer 10 is explained more fully below.

Figure 2:
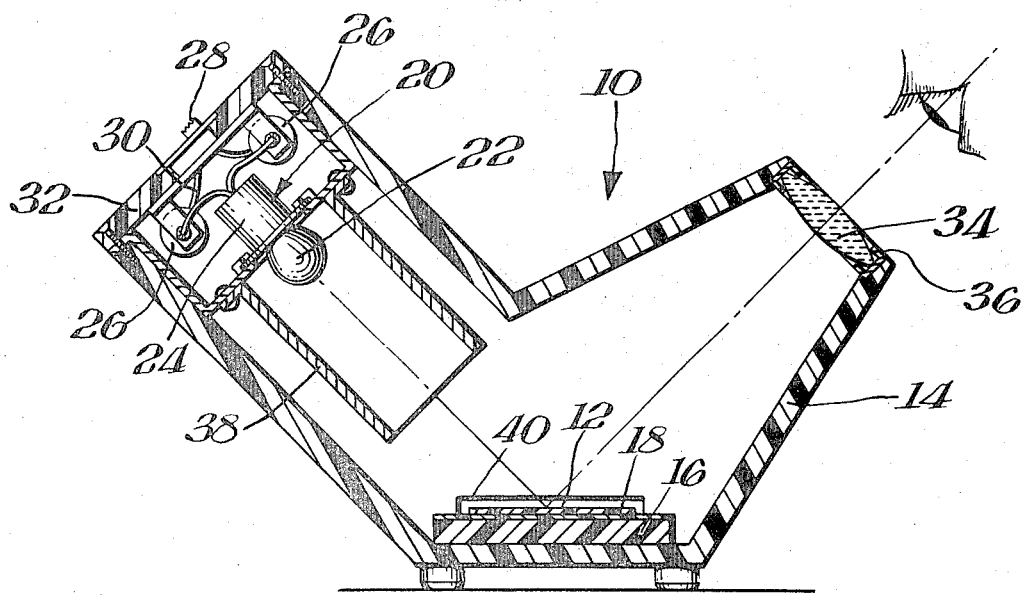
FIG. 2 is a cross sectional view taken along line 2—2 of FIG. 1.

As is clear from FIGS. 1 and 2, the negative proof viewer 10 of the present invention comprises a casing 14 which may be molded or otherwise formed of opaque thermoplastic or similar material. A support structure 16 is secured to the inside of the casing for holding the photographic negative 12. For reasons explained below, the support structure 16 has a darkened background 18 at the supporting surface of the structure.

A light source 20 is also located inside the casing 14 spaced from the support structure 16. In the embodiment of the invention illustrated in the drawing, the light source comprises a light bulb 22, holder 24, batteries 26, switch 28 and wiring 30. The light source is connected to a removable plate 32 which forms part of the casing 14. In operation, the light source is arranged to direct a beam of light onto the photographic negative 12 on the support structure 18.

A viewing lens 34 is mounted in a retainer 36 which in turn is secured to the casing 14 in the manner illustrated in FIG. 2. As is clear from the drawing, the lens 34 is located in the path of light reflected from the photographic negative 12 on the support structure 16.

Other features of the negative proof viewer 10 of the present invention include a surrounding sheath 38 for assisting in directing the beam from the bulb 22 onto the photographic negative 12. Preferably, the beam of light is directed onto the negative 12 at an angle of approximately 45°. The light beam is also reflected at a 45° angle from the negative 12. Additionally, slotted openings 40 are located in the casing 14 directly adjacent the supporting surface of the support structure 16 on opposite sides thereof. The openings 40 are in alignment with each other as well as the darkened background 18 to facilitate guiding the negative 12 onto the support structure 16 and through the casing 14. A pair of opposite slotted openings in the casing is particularly useful when strip negatives are studied with the viewer 10.

Operation of the negative proof viewer 10 of the present invention is easily accomplished in the following manner. First, the switch 28 is activated to close the light source circuit whereby the light bulb 22 is energized. A beam of light from the bulb 22 is directed at approximately 45° onto the darkened background 18 of the support structure 16. The photographic negative 12 to be viewed is then inserted into the interior of the casing 14 through one of the slotted openings 40. Thus, the negative to be observed is positioned directly adjacent the dark surface 18 on the support structure 16. The person viewing the negative then looks through the lens 34 and sees the negative 12 as a positive picture.

Although the particular mechanics by which the negative appears as a positive are not completely understood it is believed that when the gelatin side of the photographic negative is viewed at an angle approximately 90° relative to the light source, a positive picture is seen. The contrast of the observed positive is enhanced by the dark background 18 on which the negative is placed.

Finally, shaping of the viewing lens 34 of the proof viewer 10 can be made according to known optical principles whereby the lens corrects the shortening effect caused by viewing the negative at an angle of approximately 45°. However, a special lens is not required and is only needed in unusual circumstances when it is critical that the distortion factor be negligible.

What is claimed is:

1. A combination of a photographic negative and a negative proof viewer for viewing the negative and seeing it as a positive picture, the viewer comprising a casing, support structure inside the casing for holding the photographic negative, the support structure including a dark background at its supporting surface in engagement with the negative, slotted openings directly adjacent the supporting surface of the support structure on opposite sides thereof for guiding the photographic negative onto the support structure and through the casing, a light source inside the casing spaced from the support structure constructed and arranged to direct a beam of light onto the photographic negative on the support structure at an angle of approximately 45° so that the beam of light is straight from the light source to the negative, and lens means associated with the casing located in the path of light reflected from the photographic negative on the support structure.

2. A combination as in claim 1 wherein the light source includes a surrounding sheath for directing the beam of light onto the support structure.

* * * * *